United States Patent [19]

Buchan et al.

[11] Patent Number: 5,532,886
[45] Date of Patent: Jul. 2, 1996

[54] DATA STREAM SMOOTHING METHOD AND CIRCUIT FOR A TAPE DRIVE

[75] Inventors: William Buchan, Irvine; Edward Patrick, Westminster, both of Calif.; M. Takahashi, Kawauchi Onsengun, Japan; J. V. Howell, Newport Beach, Calif.

[73] Assignee: Conner Peripherals, Inc., San Jose, Calif.

[21] Appl. No.: 890,029

[22] Filed: May 28, 1992

[51] Int. Cl.⁶ .................................................. G11B 5/09
[52] U.S. Cl. .................................................. 360/51; 360/46
[58] Field of Search ........................ 360/51, 46, 36.2, 360/32; 375/120; 329/325; 358/166

[56] References Cited

U.S. PATENT DOCUMENTS

| | | | |
|---|---|---|---|
| 4,644,420 | 2/1987 | Buchan | 360/51 |
| 4,729,025 | 3/1988 | Yanase | 358/166 |
| 4,837,643 | 6/1989 | Tierney, III | 360/51 |
| 5,003,408 | 3/1991 | Farkas et al. | 360/51 |
| 5,093,732 | 3/1992 | Yoshinaka | 360/36.2 |

*Primary Examiner*—W. Chris Kim
*Attorney, Agent, or Firm*—Fliesler, Dubb, Meyer & Lovejoy

[57] ABSTRACT

A data smoother for a streaming cartridge tape drive including a data separator circuit for generating a clock signal and a second phase-locked loop circuit for removing frequency modulation arising from instantaneous speed variation (ISV) errors. The broad-band data separator follows all of the ISV generated by the cartridge tape drive to permit detection and correction of cell-slippage in a First-In-First-Out (FIFO) circuit, which accepts the data and clock signal from the data separator. The second PLL has a narrow bandwidth filter that smoothes the clock signal and removes all high-frequency ISV modulation from the data as it is clocked out from the FIFO circuit. The MFM data signal is regenerated by a monostable multivibrator in synchronism with the smoothed clock signal.

22 Claims, 6 Drawing Sheets

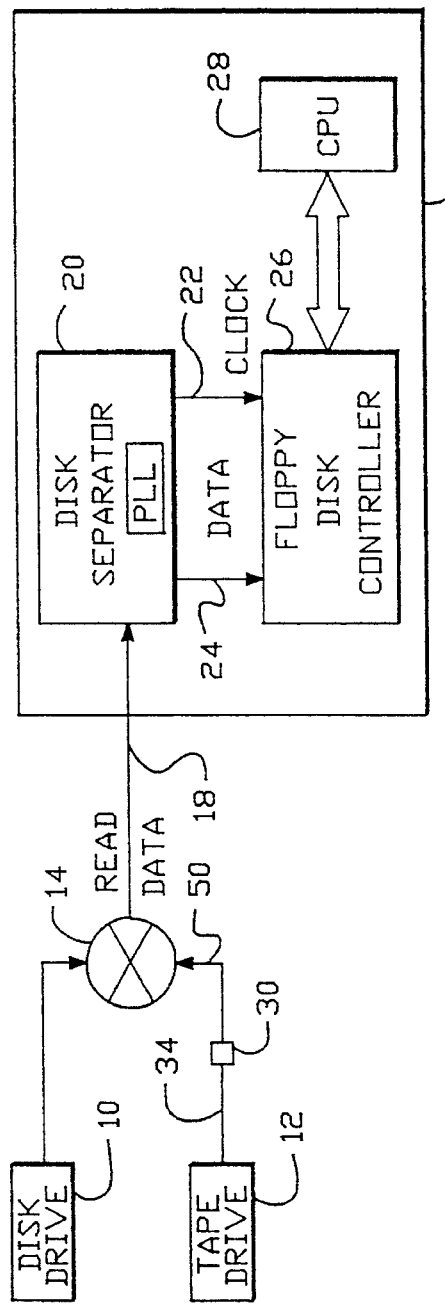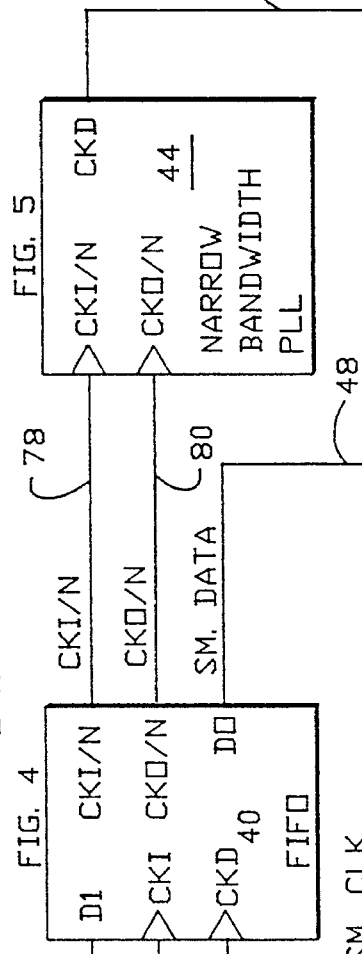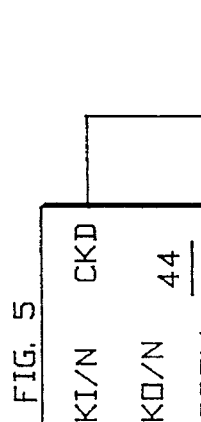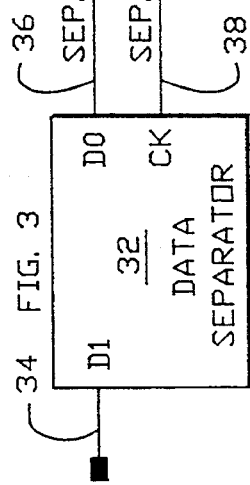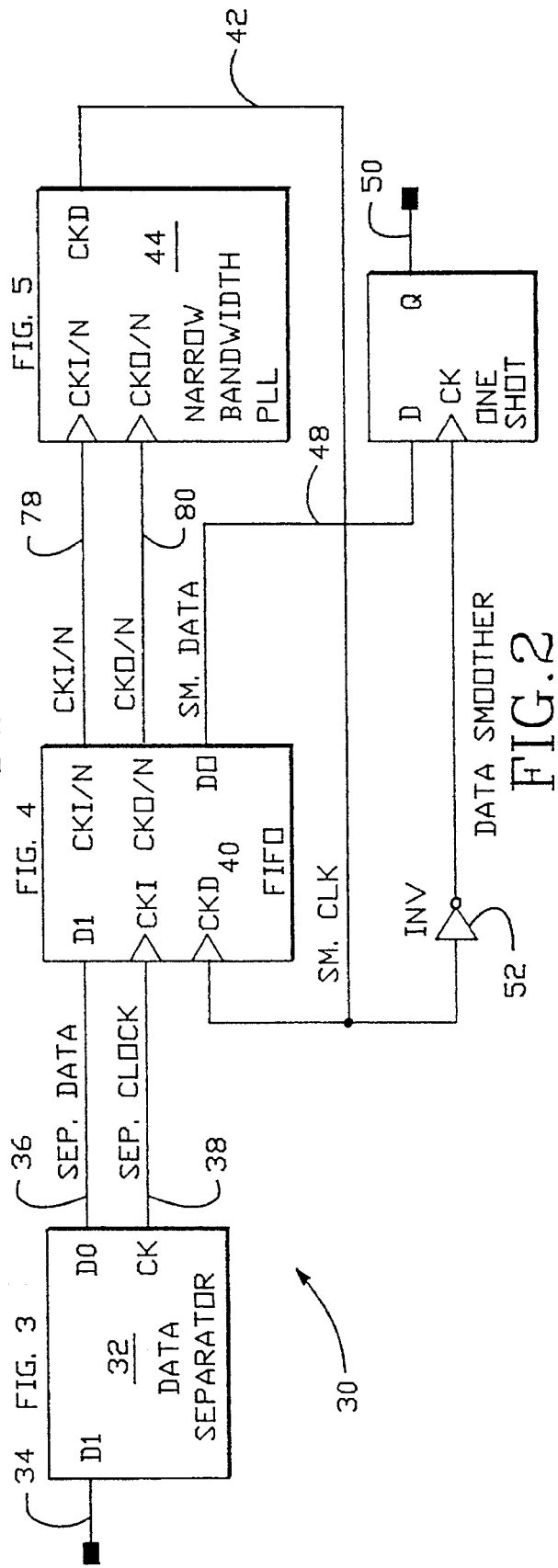
FIG. 1
FIG. 2
FIG. 3
FIG. 4
FIG. 5

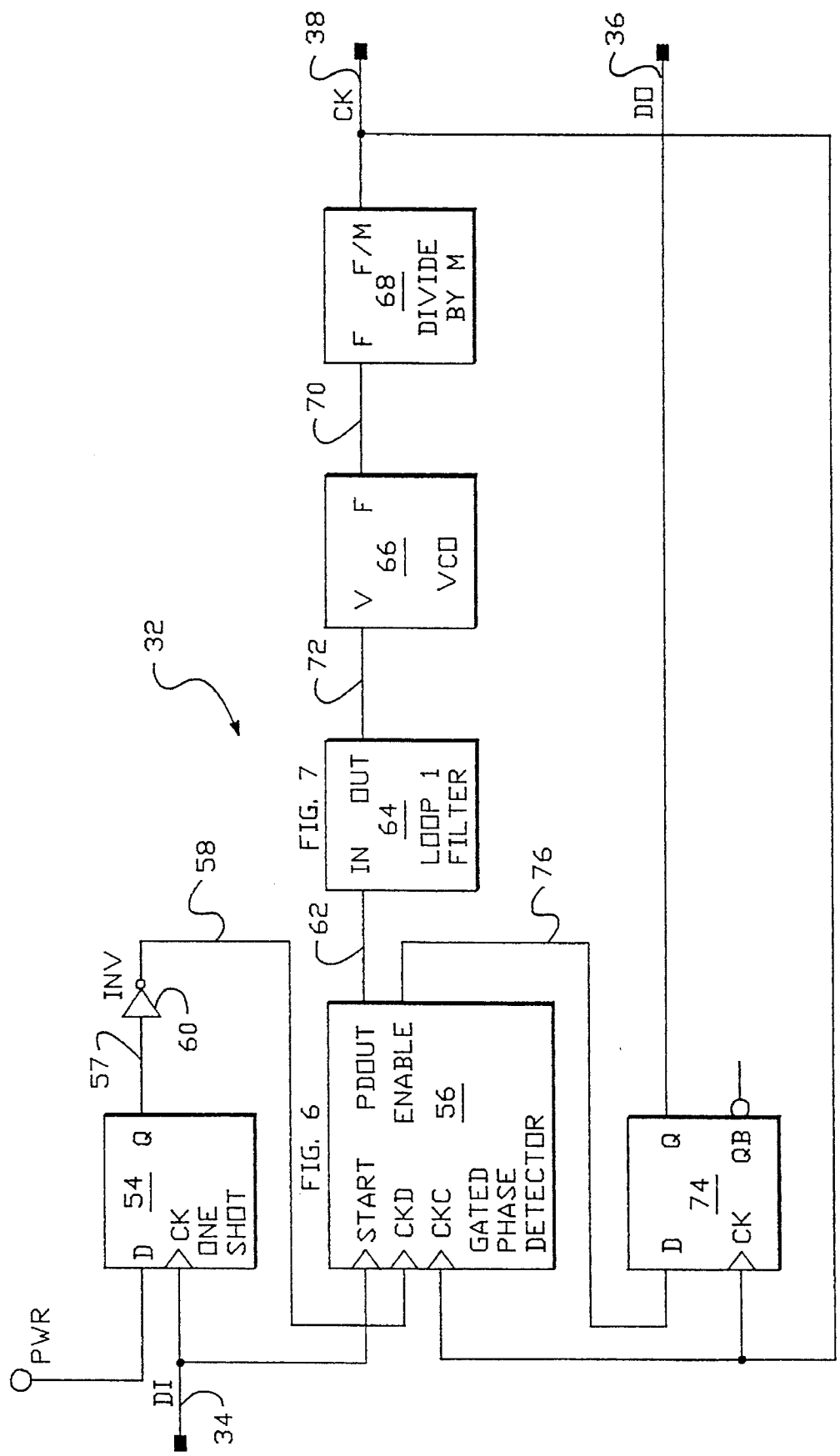
FIG. 3 DATA SEPARATOR

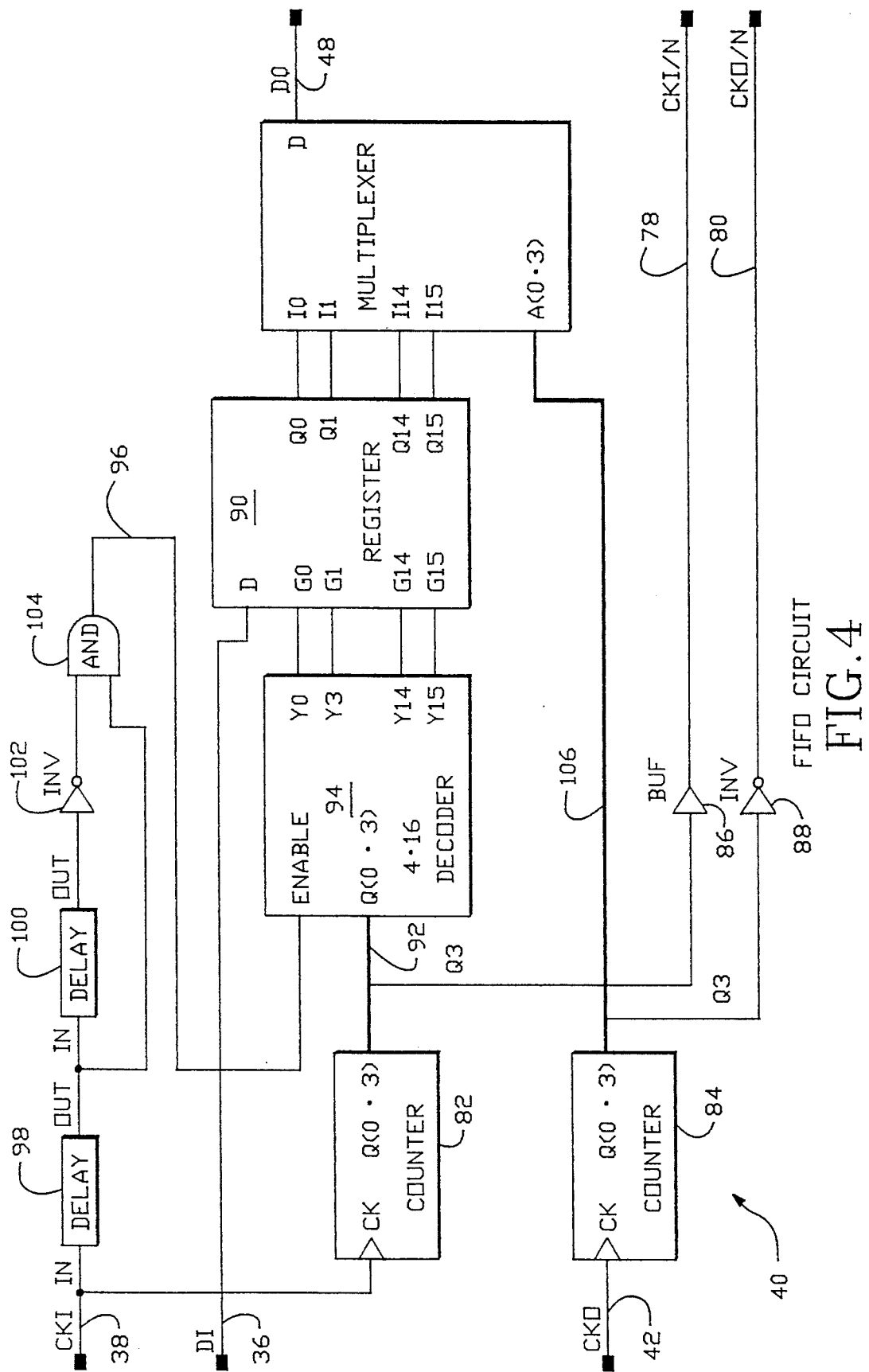
FIG. 4 FIFO CIRCUIT

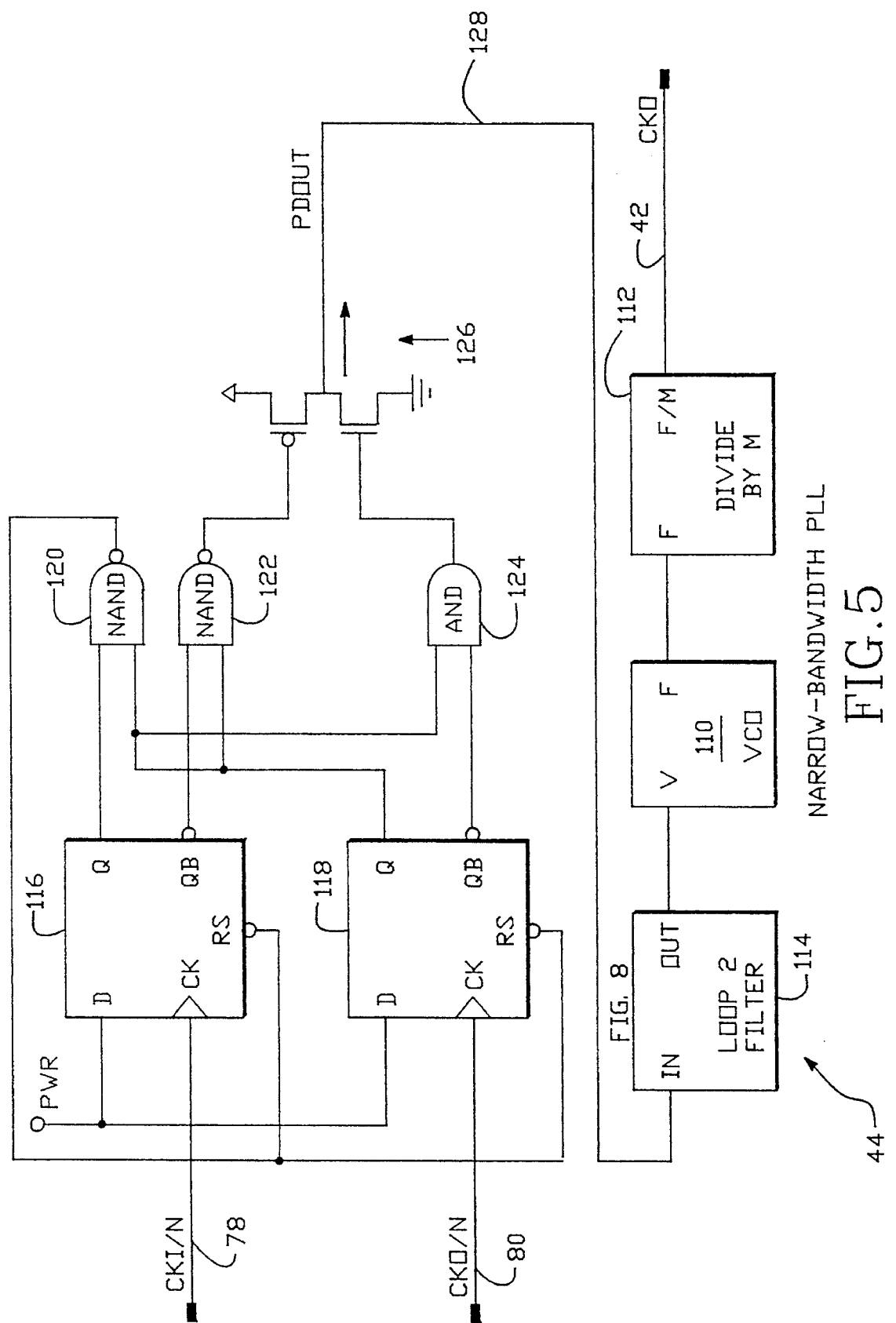

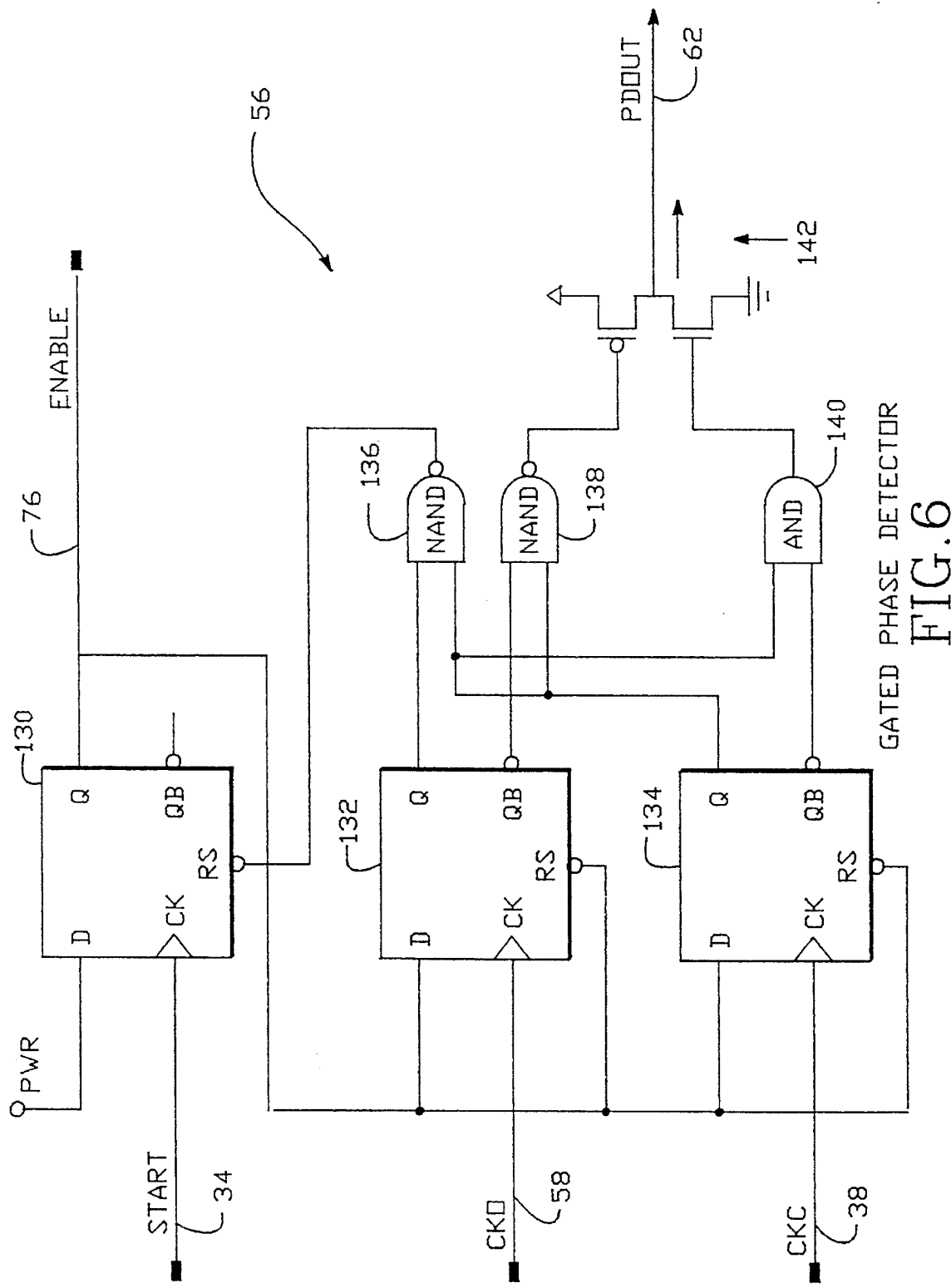
FIG. 6 GATED PHASE DETECTOR

LOOP 1 FILTER

LOOP 2 FILTER

DATA STREAM SMOOTHING METHOD AND CIRCUIT FOR A TAPE DRIVE

BACKGROUND OF THE INVENTION

1. Field of the Invention

This invention relates to apparatus for reading disk-image data from a streaming tape drive system and, more particularly, to a system for removing unwanted frequency modulation from an output data stream.

2. Discussion of the Related Art

Streaming cartridge tape drives provide mass storage of magnetic information by writing long streams of serial data pulses in a plurality of parallel streams on magnetic tape. Each stream is written at a different vertical position on the tape. After completing one serial data stream along the entire tape length at one vertical position on the tape, the streaming tape drive reverses tape direction and writes another serial data stream at a second vertical position on the tape. This recording method is known in the art as "serpentine recording".

Modern streaming tape drives are typically driven from 25 to 110 inches per second with recording densities of 10,000 flux reversals per inch or more, resulting in maximum data transfer rates above 90,000 bytes per second.

Normally, as with the MFM disk recording convention known in the art, magnetic information is recorded on the tape as a series of magnetic domains. The domains are produced by providing an appropriate write current to a magnetic write head. A blank tape is therefore equivalent to a tape having prerecorded "no information" at each data location. MFM (Modified Frequency Modulation) recording is a method of recording where a "one" (1) is represented by a flux transition in the middle of the bit cell and a "zero" (0) is represented by the absence of flux transition. A clock flux transition is written at the end of a bit cell containing a "zero" followed by a "zero".

The related art is replete with mechanisms for reading and interpreting the stream of output data from a streaming cartridge tape drive. The MFM flux transition convention discussed above and most other recording methods suffer from a variety of imperfections arising from mechanical, electronic, magnetic and user interface characteristics. One of the important new problems encountered with streaming cartridge tape drives arises from the user requirement for such drives to operate directly with floppy disk controllers in desk-top computer systems. This requires the streaming tape drive to provide an output data stream that meets the electrical and logical specifications expected for modern floppy disk drives.

Modern floppy disk controller designs tend to rely on recent improvements in floppy disk drive technology. These improvements include disk drive mechanical changes that have significantly reduced the instantaneous speed variation (ISV) errors in floppy disk drive output data streams. ISV in a floppy disk environment arises primarily from (a) fixed speed offset and (b) low-frequency periodic speed variation from mechanical eccentricities. The modern floppy disk controller is typically tuned to enhance floppy disk data recovery by narrowing the bandwidth of the data synchronizer/separator element to take advantage of the improved ISV expected from the modern floppy disk mechanism.

This situation creates a new problem for streaming cartridge tape drives that are intended for use with a floppy disk controller as the computer system interface device. The tape cartridge itself is a primary source of the problem because it introduces a significant amount of high frequency ISV that must be isolated by the interface electronics to permit proper data recovery. The modern floppy disk controller cannot pass the high frequency ISV from tape cartridges because of its narrower data synchronizer/separator bandwidth.

In U.S. Pat. No. 4,644,420, William A. Buchan, discloses a circuit and method for tracking the output data stream from a cartridge tape drive independently of the data pattern in the tape. Buchan notes that the typical phase-locked loop tape reading circuit adjusts a read window to compensate for tape cartridge speed variations by matching the read data in a phase comparator with an adjustable output frequency from a voltage-controlled oscillator (VCO). This procedure creates a problem whenever a long series of zeros passes over the read head because the VCO expects to be constantly adjusted to remove the time displacement error between the VCO frequency and the read data transfer rate. If an instantaneous speed variation occurs during a long string of binary zeros, the VCO time displacement error cannot be detected until a binary one terminates the string of zeros. Buchan also notes that the earlier attempts to solve the problem by enhancing the phase-locked loop circuit gain introduced more problems than they solved because of bandwidth limitations. Buchan teaches a solution to the problem that adds a sample-and-hold circuit to the phase-locked loop to store the time displacement error during the periods between flux transitions but does not consider the separate problem of high-frequency ISV.

In U.S. Pat. No. 4,837,643, James V. Tierney III, discloses a data smoother for a streaming cartridge tape drive that includes a refined method for adjusting the phase of a clock signal extracted from the output data stream. Tierney notes that all streaming cartridge tape drives in the art include some type of data smoother to reduce the high frequency variations in the output data stream induced by non-uniform spacing of magnetic transitions on the tape ("peak shift"). Tierney introduces a phase-locked loop and a frequency comparator circuit to permit continuous and infinitesimal adjustments to the time displacement of the clock signal extracted from the output data stream, thereby solving the problem of inadequate clock phase precision. Tierney also removes higher frequency "peak shift" components from the output data stream by adding a low pass filter to the reconstructed data clock signal circuit, but this solution does nothing to remove ISV modulation from the data stream.

In U.S. Pat. No. 5,003,408, Richard A. Farkas et al, disclose a method and apparatus for removing data stream variations from streaming cartridge tape drive signals that uses frequency-modulation techniques to remodulate the raw data stream, thereby removing the effects of ISV from the data. To accomplish this, Farkas et al use a pulse-width modulator that operates on the data stream pulses under the control of an error signal produced through a phase-locked loop that contains a low-pass loop filter for removing the higher frequency FM arising from the ISV generated in the tape cartridge mechanism.

Thus, Farkas et al, use the Buchan phase-locked loop concept for data separation and generation of a clock signal together with a new concept for filtering the higher frequencies from the clock signal. However, Farkas et al. do not suggest how their technique can cope with ISVs that are so large that they cause a "cell slippage". That is, the Farkas et al. technique works well within a single data bit cell but cannot detect nor correct cell slippage arising from very large ISVs because the intermediate to lower frequencies are also removed.

As is known in the art, the high-frequency tape cartridge ISV components that are most troublesome are those above 7 KHz caused by longitudinal tape tension changes arising from microscopic slippages in the tape cartridge tensioning mechanism. The exact ISV frequency is cartridge dependent, but a 7 KHz frequency is the typical lower limit of the tension slippage induced ISV. ISV amplitude is specified by the cartridge manufacturer to be less than five percent (peak) of the tape speed.

Because of the recent changes in floppy disk controller ISV bandwidth specifications, there is a strongly-felt need for a solution to the high-frequency ISV problem that will permit existing cartridge tape drives to interface directly with the newer floppy disk controllers. The related unresolved problems and deficiencies are clearly felt in the art and are solved by this invention in the manner described below.

SUMMARY OF THE INVENTION

This invention is a circuit that is inserted between the tape drive data read recovery circuit and the floppy disk controller read data input to remove the high-frequency ISV from the tape drive output data stream.

The circuit of this invention includes a data separator element that extracts a clock signal that follows all of the ISV coming from the tape drive, a First-In-First-Out (FIFO) circuit that delays each pulse of the data signal according to the clock signal from the data separator, and a second narrow-bandwidth phase-locked loop (PLL) that resynchronizes the clock signal to remove all remaining high-frequency ISV components. A monostable multivibrator or other means is then used to regenerate the data stream as an MFM stream of data pulses according to the "clean" clock signal from the second PLL.

It is a feature of this invention that it employs two independent phase-locked loops (PLLs). The first PLL is embedded in the data separator circuit to track the ISV and provide a tracking clock. The tracking clock is used in the data separator to place the "clock" and "data" transitions into a known timing relationship embodied as a clocked output data stream where a data "one" represents a flux transition in a manner known in the art. The closed-loop bandwidth of this first PLL is sufficiently wide-band to preserve all frequency modulation components present in the output data stream signal, thereby preserving all cell slippage information. The second PLL is a novel and non-obvious element of this invention for removing ISV components from the data without loss of fixed data frequency offsets. The closed-loop bandwidth of this second PLL is sufficiently narrow-band to attenuate all ISV above a predetermined frequency, such as 4 KHz.

The demodulation method of this invention uses the second PLL to clock the data stream out of a temporary FIFO storage register. It is a feature of this invention that the narrow bandwidth of the second PLL attenuates the high-frequency component of the ISV but passes the fixed offset and low frequency components, thereby minimizing the size of the FIFO register required and preventing undetected cell slippage.

It is another advantage of this invention that the second PLL also further attenuates the "peak shift" from the MFM data stream known to result from the "bit crowding" problem.

It is an object of this invention to remove sufficient ISV from a cartridge tape drive output data stream to permit direct presentation of the resulting "smooth" data stream to the ISV-intolerant floppy disk controllers recently introduced to the art.

It is another object of this invention that the data smoothing circuit handle multiple selectable data rates.

The foregoing, together with other objects, features and advantages of this invention, will become more apparent when referring to the following specification, claims and accompanying drawing.

BRIEF DESCRIPTION OF THE DRAWINGS

For a more complete understanding of this invention, reference is now made to the following detailed description of the embodiment as illustrated in the accompanying drawing, wherein:

FIG. 1 shows a block diagram illustrating the data smoothing circuit of this invention disposed in a typical computer system employing both a floppy disk drive and a backup tape drive;

FIG. 2 is a block diagram illustrating the preferred embodiment of the data smoother of this invention;

FIG. 3 is a block diagram illustrating the preferred embodiment of the data separator circuit from FIG. 2;

FIG. 4 is a block diagram illustrating the preferred embodiment of the FIFO circuit of FIG. 2;

FIG. 5 is a block diagram illustrating the preferred embodiment of the narrow-bandwidth PLL of FIG. 2;

FIG. 6 is a logic diagram illustrating the preferred embodiment of the gated phase detector of FIG. 3;

DETAILED DESCRIPTION OF THE PREFERRED EMBODIMENT

Figure 7:
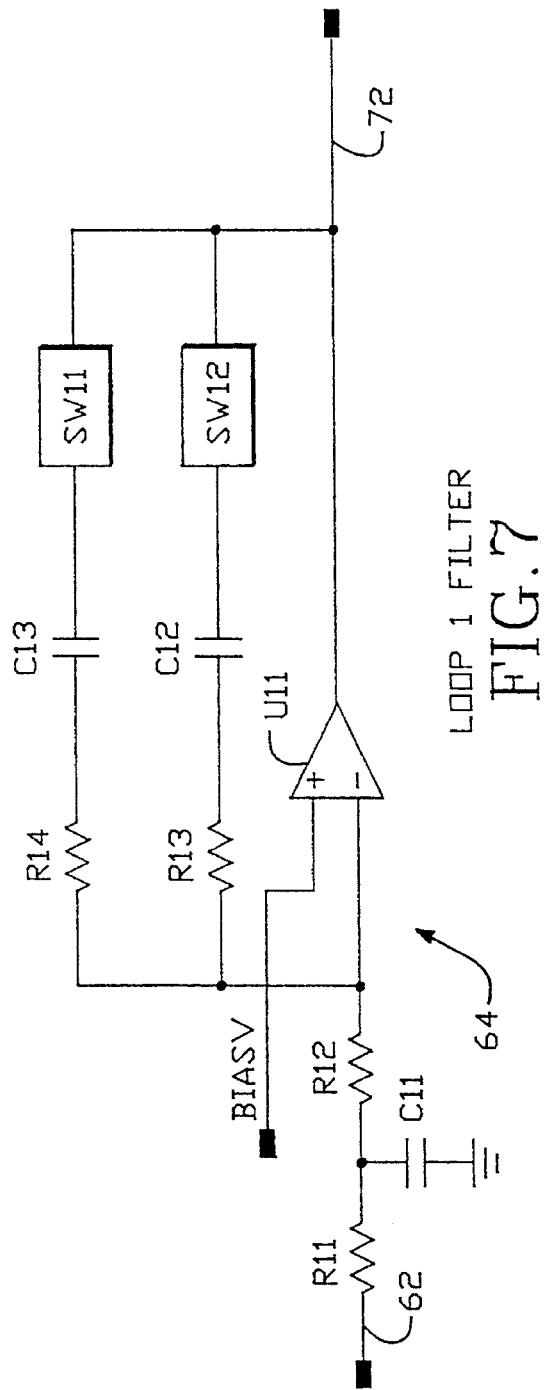
FIG. 7 is a circuit diagram showing an illustrative embodiment of a simplified active loop filter from FIG. 3 for multiple data rates.

FIG. 1 illustrates an arrangement for reading data from a disk drive 10 or a tape drive 12 through a selection switch 14 to a computer 16. Switch 14 is not required where drives 10 and 12 are interfaced onto a common bus. Computer 16 accepts a stream of read data pulses at the data pulse stream input 18 to a data separator 20. Data separator 20 extracts a clock signal 22 and passes clock signal 22 together with the regenerated transition data pulse stream 24 to a floppy disk controller 26 within computer 16. Floppy disk controller 26 then assembles the clocked data stream and reformats it for bus transfer to the CPU 28 in a manner well-known in the art.

The typical computer user finds it very convenient and desirable to select disk drive 10 or tape drive 12 by means of a simple floppy data bus drive selection command or through selection switch 14, thereby allowing the user to back-up his disk drive files on a streaming cartridge tape drive in the form of disk data images using the same interface electronics. This ease of drive substitution is desired to ensure frequent data back-up, thereby avoiding expensive data losses.

Accordingly, because recent floppy disk controller designs tend to rely on the reduced ISV specifications for modern floppy disk drives, some circuitry now used in the art for implementing data separator 20 can no longer accept the ISV still present in cartridge tape drive output data streams. This invention introduces an improved data separator embodiment that removes the high-frequency ISV from cartridge tape drives without losing data cell lock and provides a "smoothed" data pulse stream that is palatable to data separator 20.

FIG. 2 shows the data smoother 30 of this invention. Data smoother 30 is disposed in FIG. 1 in the position between the tape read data recovery circuit (not shown) in tape drive 12 and read data pulse stream input 18 for computer 16.

Data smoother 30 includes a data separator 32 that follows all of the ISV arising from mechanical, magnetic and like effects in the raw tape drive data pulse stream 34 from tape drive 12. Data separator 32 generates a stream of regenerated flux transition data pulses 36 and an associated clock signal 38. Clock signal 38 toggles at two (2) times the MFM data rate, thereby providing a timing signal for every possible "data" and "clock" flux transition. A "one" at clock signal 38 without a "one" at data stream 36 represents the absence of a flux transition.

Both data pulse stream 36 and clock signal 38 are presented to a First-In-First-Out (FIFO) circuit 40, which serves as a variable pulse edge delay circuit responsive to a smoothed clock signal 42. Smoothed clock signal 42 is created by a narrow closed-loop bandwidth Phase-Locked Loop (PLL) 44, which creates and synchronizes smoothed clock signal 42 according to separated clock signal 38 in a manner described more fully below in connection with FIG. 5.

Finally, a monostable multivibrator 46 accepts the smoothed data pulse stream 48 from FIFO circuit 40 and generates an MFM output signal 50 responsive to smoothed clock signal 42. Multivibrator 46 creates a smooth and clean stream of output data pulses having equal pulse width, with each leading edge synchronized by smoothed clock signal 42. Thus, MFM output signal 50 contains no significant high-frequency ISV components and may be properly processed by data separator 20 (FIG. 1) when presented at read data pulse stream input 18. In FIG. 2, the inverter 52 provides the polarity reversal to smoothed clock signal 38 required for proper operation of multivibrator 46.

FIG. 3 provides a detailed block diagram of data separator 32 from FIG. 2. Data separator 32 has a wide closed-loop bandwidth. The frequency of separated clock signal 38 is twice the frequency of raw data pulse stream 34. Initially, a pulse in raw data pulse stream 34 arrives at a monostable multivibrator 54 and a gated phase detector 56. Multivibrator 54 produces a fixed pulse width of T=0.25* (MFM data bit period) to produce an internal clock signal 57, which is then inverted by the inverter 60 to form the internal clock signal 58. Inverter 60 also provides the necessary additional logic inversion for proper operation of gated phase detector 56.

Gated phase detector 56 accepts data pulse 34, internal clock signal 58 and separated clock signal 38 to produce a clock phase error output signal 62. The loop filter 64 is an active filter having two poles and a zero so that a stable third order PLL is formed when the loop is closed. The remainder of the PLL includes a Voltage Controlled Oscillator (VCO) 66 and a divide-by-M counter 68. VCO 66 generates a single frequency signal 70 whose frequency is related to the DC voltage level 72 in a manner well-known in the art. Counter 68 divides down the frequency of output signal 70 to form the separated clock signal 38, which is then fed back to one of the inputs of gated phase detector 56 and to a Data-type multivibrator 74. Multivibrator 74 accepts the "enable" pulse signal 76 from gated phase detector 56 and clocks this signal out as separated data pulse stream 36 in synchronism with separated clock signal 38. Pulse signal 76 is the raw tape drive data pulse stream 34 with each pulse stretched beyond the next falling edge of internal clock signal 58 and the next rising edge of separated clock signal 38 (FIG. 6).

Thus, the PLL in data separator 32 acts to change the timing of separated clock signal 38 as needed to reduce the phase error between signal 38 and internal clock signal 58, which represents data pulse stream 34 timing. The wide loop bandwidth provided by filter 64 allows this loop error correction to occur rapidly compared to the ISV rate in data pulse stream 34, thus allowing all higher frequency ISV components to pass through as part of separated clock signal 38.

FIG. 4 shows a block diagram representation of FIFO circuit 40. Circuit 40 accepts separated clock signal 38, separated data pulse stream 36, and smoothed clock signal 42 at the locations shown and creates smoothed data pulse stream 48 and the two intermediate clock signals 78 and 80. Signal 78 is merely separated clock signal 38 divided by N through the counter 82. Signal 80 is smoothed clock signal 42 similarly divided by N through the counter 84. A buffer 86 and an inverter 88 provide the proper polarities to intermediate clock signals 78 and 80, respectively.

Each pulse of separated data pulse stream 36 is first clocked into the 16-bit storage register 90. As counter 82 is incremented responsive to separated clock signal 38, the counter output word 92 is decoded by the 4-16 decoder circuit 94. Decoder circuit 94 creates a 16-bit output word and presents it as a storage address to storage register 90 in response to an enable signal 96. Signal 96 is a narrow pulse that is delayed by circuit 98. The signal 96 pulse width is controlled by circuit 100. Each signal 96 pulse is triggered by a rising edge in separated clock signal 38. The 16-bit address word from decoder circuit 94 serves to individually locate each incoming separated data stream pulse 36 into a selected location within storage register 90.

As stated above, counter 84 is sequenced in accordance with smoothed clock signal 42 and the 4-bit output word 106 is presented to the 16-1 multiplexer circuit 108. Each pulse in smoothed data pulse stream 48 is determined by the 4-bit word 106, which selects one of the 16-bits presented to multiplexer circuit 108 from storage register 90. Thus, it can be appreciated that storage register 90 stores the pulses in separated data pulse stream 36 at locations determined by the decoded 4-bit word 92 from counter 82 responsive to separated clock signal 38 and that these stored pulse values are clocked out as smoothed data pulse stream 48 with a new "smooth" timing governed according to the 4-bit word 106 created by counter 84 in response to smoothed clock signal 42.

The embodiment of FIFO circuit 40 shown in FIG. 4 has the capability for multiple data rate operation. The length of storage register 90 can be changed (not shown) to accommodate different data rates. An example of the necessary FIFO storage register 90 length calculation is as follows:

Assume:

(a) the minimum ISV frequency is 7 KHz with a maximum five percent peak amplitude;

(b) the ISV is a square wave instead of a damped sinusoidal wave; and (c) the raw data pulse stream repetition rate is 500 KHz.

Thus, the ISV period=1/7 KHz=143 microseconds. The FIFO storage register 90 fills during the positive half of the ISV period cycle and empties during the negative half-cycle and the time for the ISV half-cycle=72 microseconds.

The data rate×2=1 MHz, which means that a single separated clock signal cycle occupies 1 microsecond. Thus, there are 72 complete clock cycles during one-half of the ISV cycle. Because the peak amplitude of the ISV is 5 percent, there are 75.6 input clock pulses (105% of 72) during the ISV positive half-cycle and 72 output clock pulses are generated during this same period of time. The negative half-cycle of ISV returns the FIFO to its original state. Thus, the quiescent state of the FIFO should be half-full because the first cycle can be either positive or negative.

Thus, a FIFO storage register length of ±4 bits (8 bits half-full) is sufficient to accommodate the maximum value for ISV with these assumptions. For a one megabit per second raw data pulse stream rate and the assumed ISV frequency and peak amplitude, the FIFO storage register 90 length necessary to accommodate the ISV is ±8 bits (16 bits half-full), which is the register length illustrated in FIG. 4.

The above assumptions arise from tape cartridge manufacturer specifications, which suggest a lower frequency limit on ISV of 7 KHz and an upper ISV amplitude limit of five percent of peak output signal. Thus, for the raw tape drive data pulse stream rate of 1 MHz assumed, the preferred 16-bit data register 90 embodiment should be adequate to accommodate all ISV distortion in raw tape drive data pulse stream 34, thereby avoiding any possibility of undetected cell slippage during subsequent data smoothing. Other effects governing the selection of FIFO length include frequency and phase shift effects from write splices and media interchange, lock range limits, and the closed-loop damping factor of the "narrow bandwidth" PLL.

FIG. 5 is a block diagram illustrating the preferred embodiment of narrow closed-loop bandwidth PLL 44 from FIG. 2. "Narrow-band" PLL 44 is an uncomplicated phase-locked loop configured as is well-known in the art, having a VCO 110, a divide-by-M circuit 112, and the loop filter 114 all disposed in series with a simplified phase detector circuit. The simplified phase detector circuit consists of the two Data-type multivibrators 116 and 118, the two NAND gates 120 and 122, and the AND gate 124. These circuits are coupled to the remainder of narrow-band PLL 44 through a summing network 126, which connects the internal phase error signal 128 to loop filter 114. Thus, error signal 128 rises or falls depending on the phase difference between the two intermediate clock signals 78 and 80. Because intermediate clock signal 80 is derived from smoothed clock signal 42, changes in the phase of smoothed clock signal 42 made in response to the value of internal phase error signal 128 will immediately be fed back, changing internal phase error signal 128 in the manner well-known in the art for such phase-locked loop circuits.

Figure 8:
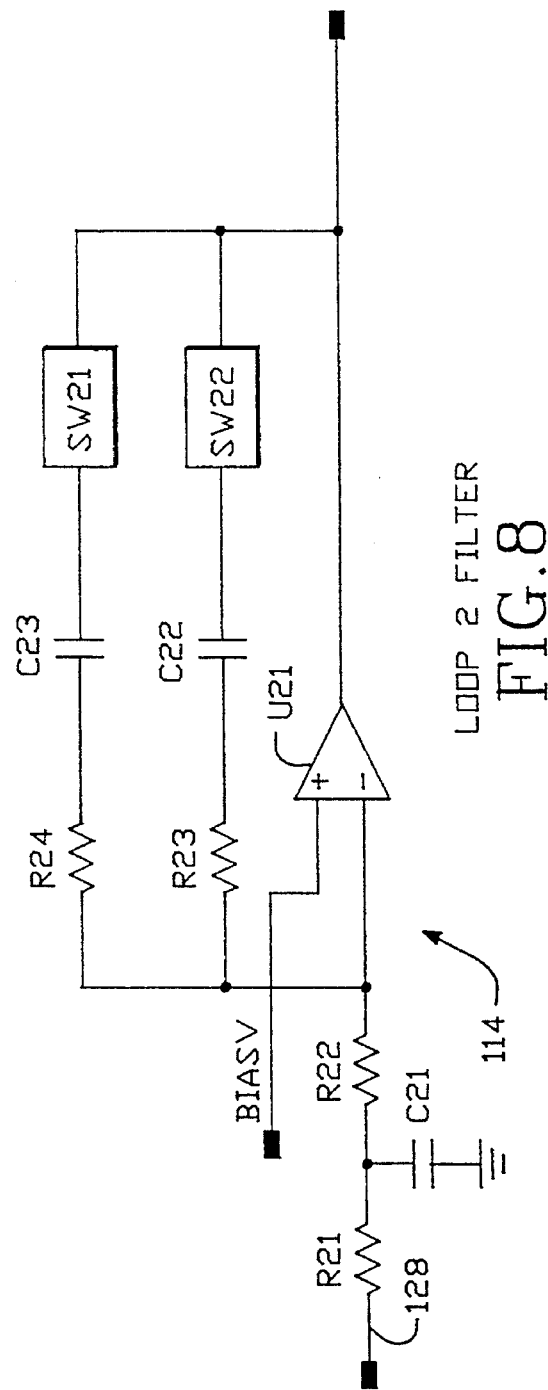
FIG. 8 is a circuit diagram showing an illustrative embodiment of the simplified active loop filter from FIG. 5 for multiple data rates.

Phase error correction is constrained by the narrow closed-loop bandwidth provided by loop filter 114, which is an active filter with two poles and one zero (FIG. 8). The bandwidth should be chosen to remove all FM above, say 4 KHz, so that the newer disk controllers can accept the resulting signal.

Intermediate clock signals 78 and 80 are equivalent to the most significant bits of output words 92 and 106 (FIG. 4) from counters 82 and 84, respectively. Thus, narrow-bandwidth PLL 44 strives to keep 16-bit storage register 90 half-full, no more and no less. The bandwidth of PLL 44 attenuates the high frequency ISV components but passes the fixed offset and low frequency ISV components. There is a trade-off between closed-loop bandwidth and FIFO length. A wider bandwidth minimizes the necessary length of storage register 90, passing along the lower frequency (longer length) ISV modulation components so that register 90 need not be lengthened to store their effects.

FIG. 6 provides a simplified logic circuit diagram illustrating the main features of the preferred embodiment of gated phase detector 56 from FIG. 3. The logical components in FIG. 6 consist of the three Data-type multivibrators 130, 132 and 134, the two NAND gates 136 and 138, the AND gate 140, and the output driver 142. Circuit operation is readily appreciated by reference to the conventional functions of each of these elements and the above discussion in connection with the simplified phase detector of FIG. 5.

The enable pulse signal 76 is presented to the Data inputs of multivibrators 132 and 134, which are clocked by internal clock signal 58 and separated clock signal 38, respectively. Multivibrators 132 and 134 form part of the phase comparator circuit that provides the clock phase error output signal 62 used in the phase-locked loop portion of data separator 32 (FIG. 3). Data pulse 34 clocks multivibrator 130, forcing a positive pulse on enable signal line 76. Thus, the pulse on line 76 begins with the pulse on line 34 and continues until the closing transitions of both internal clock signal 58 and separated clock signal 38.

FIG. 7 provides an illustrative embodiment of the active loop filter 64 with the switches SW 11 and SW 12 provided for switching the bandwidth of loop filter 64 to accommodate changes in raw tape drive data pulse rate 34. The electronic operation of loop filter 64 is well-known in the art. The preferred closed-loop bandwidth is chosen to properly track the input data rate.

Similarly, FIG. 8 provides an illustrative embodiment of loop filter 114, which is also an active filter switchable among a plurality of raw tape drive data pulse rates by virtue of the two switches SW 21 and SW 22. Other than the selection of the components R21–R24 and C21–C23 to provide a narrower closed-loop pass-band, the operation of loop filter 114 is essentially identical to the operation of loop filter 64 in FIG. 7. The preferred closed-loop bandwidth is chosen to properly attenuate the unwanted high-frequency ISV in the input data signal.

Other embodiments and modifications of this invention will occur readily to those of ordinary in the art in view of these teachings. Therefore this invention is to be limited only by the following claims, which include all such embodiments and modifications when viewed in conjunction with the above specification and accompanying drawings.

We claim:

1. A circuit for smoothing a stream of data pulses, comprising:

an input adaptable for coupling to a tape drive;

an output adaptable for coupling to a computer;

separator means, coupled to said input, for extracting a separate clock signal from said stream of data pulses and for generating a stream of clocked data pulses;

first phase-locked loop (PLL) means for removing frequency modulation and phase modulation from said separate clock signal to form a smoothed clock signal;

First-In-First-Out (FIFO) means, coupled to said separator means and to said first PLL means, for delaying each said clocked data pulses in said stream of data pulses responsive to said smoothed clock signal to form a smoothed stream of clocked data pulses at said output; and monostable multivibrator means, coupled to said FIFO means and to said output, for generating a smoothed stream of clocked data pulses responsive to said smoothed clocked signal and to said delayed clocked data pulses.

2. The circuit of claim 1 wherein said separator means comprises:
   second PLL means for removing phase modulation from said stream of data pulses, said second PLL means including a wide-band loop filter; and
   second monostable multivibrator means for generating said stream of clocked data pulses responsive to said separate clock signal.

3. The circuit of claim 2 wherein said FIFO means comprises:
   input counter means for generating an internal FIFO clock signal;
   data register means for storing said clocked data pulses as bits of input data responsive to said internal FIFO clock signal; and
   output counter means for selecting said bits of input data for output as said smoothed stream of clocked data pulses responsive to said smoothed clock signal.

4. The circuit of claim 3 wherein said data register means comprises:
   a variable-length data register; and
   data rate selector means for selecting a data register length to accommodate a predetermined repetition rate of said separate clock signal.

5. The circuit of claim 4 wherein said first PLL means comprises:
   one or more selectable loop filter elements; and
   first bandwidth selector means for selecting said loop filter elements to create a first PLL bandwidth to accommodate a predetermined repetition rate of said separate clock signal.

6. The circuit of claim 1 wherein said separator means comprises:
   second PLL means for removing phase modulation from said stream of data pulses, said second PLL means including a wide-band loop filter; and
   second monostable multivibrator means for generating said stream of clocked data pulses responsive to said separate clock signal.

7. The circuit of claim 6 wherein said first PLL means comprises:
   one or more selectable loop filter elements; and
   first bandwidth selector means for selecting said loop filter elements to create a first PLL bandwidth to accommodate a predetermined repetition rate of said separate clock signal.

8. The circuit of claim 6 wherein said second PLL means comprises:
   one or more selectable loop filter elements; and
   second bandwidth selector means for selecting said second loop filter elements to create a second PLL bandwidth to accommodate a predetermined repetition rate of said separate clock signal.

9. The circuit of claim 1 wherein said FIFO means comprises:
   input counter means for generating an internal FIFO clock signal;
   data register means for storing said clocked data pulses as bits of input data responsive to said internal FIFO clock signal; and
   output counter means for selecting said bits of input data for output as said smoothed stream of clocked data pulses responsive to said smoothed clock signal.

10. The circuit of claim 9 wherein said data register means comprises:
    a variable-length data register; and
    data rate selector means for selecting a data register length to accommodate a predetermined repetition rate of said separate clock signal.

11. In a streaming magnetic cartridge tape drive apparatus for reading and writing binary data on magnetic tape cartridges, a data smoother circuit disposed between said magnetic tape cartridge drive apparatus and a computer, said circuit comprising:
    separator means coupled to an input, for extracting a separate clock signal from a stream of data pulses and for generating a stream of clocked data pulses;
    first phase-locked loop (PLL) means for removing frequency modulation and phase modulation from said separate clock signal to form a smoothed clock signal;
    First-In-First-Out (FIFO) means, coupled to said separator means and to said first PLL means, for delaying each said clocked data pulse in said stream of clocked data pulses responsive to said smoothed clock signal to form a smoothed stream of clocked data pulses at an output; and
    monostable multivibrator means, coupled to said FIFO means and to an output of said smoother circuit, for generating a smoothed stream of clocked output data pulses responsive to said smoothed clocked signal and to said smoothed stream of clocked data pulses from said FIFO means.

12. The circuit of claim 11 wherein said separator means comprises:
    second PLL means for removing phase modulation from said stream of data pulses, said PLL means including wide-band loop filter; and
    second monostable multivibrator means for generating said stream of clocked data pulses responsive to said separate clock signal.

13. The circuit of claim 12 wherein said FIFO means comprises:
    input counter means for generating an internal FIFO clock signal;
    data register means for storing said clocked data pulses as bits of input data responsive to said internal FIFO clock signal; and
    output counter means for selecting said bits of input data for output as said smoothed stream of clocked data pulses responsive to said smoothed clock signal.

14. The circuit of claim 13 wherein said data register means comprises:
    a variable-length data register; and
    data rate selector means for selecting a data register length to accommodate a predetermined repetition rate of said separate clock signal.

15. The circuit of claim 14 wherein said first PLL means comprises:
    one or more selectable loop filter elements; and
    first bandwidth selector means for selecting said loop filter elements to create a first PLL bandwidth to accommodate a predetermined repetition rate of said separate clock signal.

16. The circuit of claim 12 wherein said second PLL means comprises:
    one or more selectable loop filter elements; and
    second bandwidth selector means for selecting said second loop filter elements to create a second PLL bandwidth to accommodate a predetermined repetition rate of said separate clock signal.

17. The circuit of claim 11 wherein said FIFO means comprises:

data register means for storing said clocked data pulses as bits of input data responsive to an internal FIFO clock signal; and output counter means for selecting said bits of input data for output as said smoothed stream of clocked data pulses responsive to said smoothed clock signal.

18. The circuit of claim 17 wherein said data register means comprises:

a variable-length data register; and data rate selector means for selecting a data register length to accommodate a predetermined repetition rate of said seperate clock signal.

19. A method for removing the effects of Instantaneous Speed Variation (ISV) from a stream of input data pulses to form a smooth stream of output data pulses, said method comprising the steps of:

(a) generating a first clock signal;

(b) measuring the timing difference between said first clock signal and said input data pulses;

(c) adjusting the value of said first clock signal frequency in a direction that reduces said timing difference by no less than one percent during a single clock cycle;

(d) generating a second clock signal having a second frequency;

(e) measuring the phase difference between said first clock signal and said second clock signal;

(f) adjusting the value of said second clock signal frequency in a direction that reduces said phase differences during a single clock cycle; and (g) generating a smoothed stream of output data pulses where each said output data pulse is synchronized according to said second clock signal and where said each output data pulse adopts the binary value of a corresponding said input data pulse and outputted in asynchronous relation to the input of said corresponding said input data pulse.

20. The method of claim 19 wherein:

said adjusting step (c) is performed while permitting said first clock signal frequency changes to occur at a rate greater than one percent of an instantaneous repetition rate of said input data pulses; and said adjusting step (f) is performed while constraining said second clock signal frequency changes to occur at a rate less than one-half percent of said instantaneous repetition rate of said input data pulses.

21. A circuit for smoothing a stream of data pulses, comprising;

an input adaptable for coupling to a tape drive;

an output adaptable for coupling to a computer;

separator means, coupled to said input, for extracting a separate clock signal from said stream of data pulses and for generating a stream of clocked data pulses;

first phase-locked loop (PLL) means for removing frequency modulation and phase modulation from said separate clock signal to form a smoothed clock signal; and First-In-First-Out (FIFO) means, coupled to said separator means and to said first PLL means, for delaying each said clocked data pulses in said stream of data pulses responsive to said smoothed clock signal to form a smoothed stream of clocked data pulses at said output;

wherein said FIFO means includes:

input counter means for generating an internal FIFO clock signal;

data register means for storing said clocked data pulses as bits of input data responsive to said internal FIFO clock signal; and output counter means for selecting said bits of input data for output as said smoothed stream of clocked data pulses responsive to said smoothed clock signal.

22. In a streaming magnetic cartridge tape drive apparatus for reading and writing binary data on magnetic tape cartridges, a data smoother circuit disposed between said magnetic tape cartridge drive apparatus and a computer, said circuit comprising:

separator means, coupled to an input, for extracting a separate clock signal from a stream of data pulses and for generating a stream of clocked data pulses;

first phase-locked loop (PLL) means for removing frequency modulation and phase modulation from said separate clock signal to form a smoothed clock signal; and First-In-First-Out (FIFO) means, coupled to said separator means and to said first PLL means, for delaying each said clocked data pulse in said stream of clocked data pulses responsive to said smoothed clock signal to form a smoothed stream of clocked data pulses at an output;

wherein said FIFO means includes:

data register means for storing said clocked data pulses as bits of input data responsive to an internal FIFO clock signal; and output counter means for selecting said bits of input data for output as said smoothed stream of clocked data pulses responsive to said smoothed clock signal.

* * * * *